United States Patent [19]

Woodward et al.

[11] Patent Number: 4,582,785

[45] Date of Patent: Apr. 15, 1986

[54] PHOTOGRAPHIC POLYOLEFIN COATED BASE PAPERS AND METHOD OF MAKING

[75] Inventors: Antony I. Woodward, Chesham; Garry Barnes, High Wycombe; George Tyler, Prestwood, all of England

[73] Assignee: The Wiggins Teape Group Limited, Buckinghamshire, England

[21] Appl. No.: 670,060

[22] Filed: Nov. 9, 1984

Related U.S. Application Data

[63] Continuation of Ser. No. 461,130, Jan. 26, 1983, abandoned.

[30] Foreign Application Priority Data

Jan. 29, 1982 [GB] United Kingdom ............... 8202611

[51] Int. Cl.$^4$ ................................................ G03C 1/86
[52] U.S. Cl. ............................... 430/538; 156/244.11; 162/135; 427/41; 428/512; 428/513; 430/532; 430/534
[58] Field of Search ............... 162/135; 430/532, 534, 430/538; 525/186, 511, 537; 427/41; 156/244.11; 428/512, 513

[56] References Cited

U.S. PATENT DOCUMENTS

| | | | |
|---|---|---|---|
| 3,755,069 | 8/1973 | Crawford et al. | 430/538 |
| 4,115,125 | 9/1978 | Etter et al. | 430/538 |
| 4,344,876 | 8/1982 | Berner | 525/186 |
| 4,352,861 | 10/1982 | Von Meer | 430/528 |

FOREIGN PATENT DOCUMENTS

1496635 12/1977 United Kingdom .
2048278 12/1980 United Kingdom .

OTHER PUBLICATIONS

Research Disclosure 20807, Aug. 1981, Ciba-Geigy, Basie.

Primary Examiner—Jack P. Brammer
Attorney, Agent, or Firm—Burns, Doane, Swecker & Mathis

[57] ABSTRACT

Polyolefin coated photographic base papers are stabilized by a polymeric hindered amine (Chimassorb 944) having a mean molecular weight above 2500. The stabilizer is highly effective and overcomes a diminution of opacity noted with the use of phosphonate esters of the prior art.

10 Claims, 2 Drawing Figures

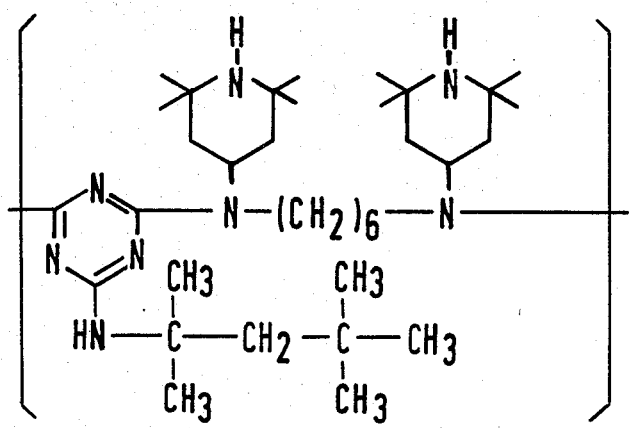
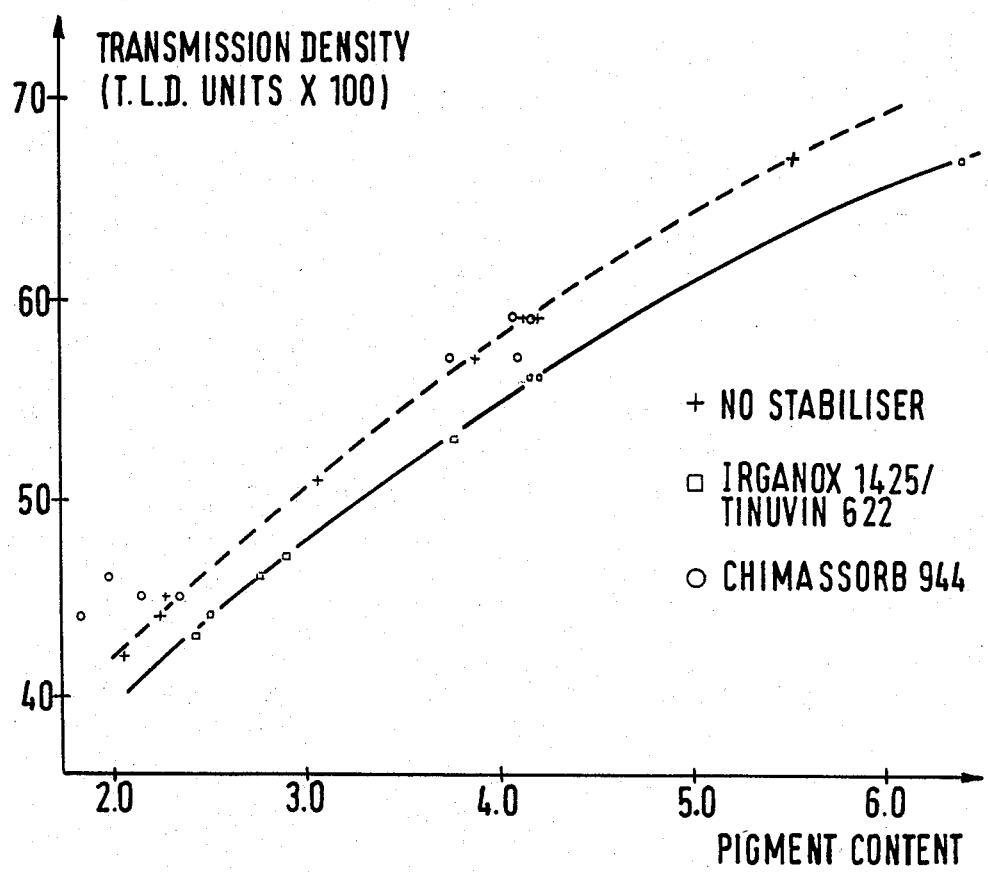

PHOTOGRAPHIC POLYOLEFIN COATED BASE PAPERS AND METHOD OF MAKING

This application is a continuation of application Ser. No. 461,130, filed Jan. 26, 1983 now abandoned.

This invention relates to resin coated photographic base papers and a process for their preparation.

A considerable amount of the photographic base paper used in the world is of the resin coated kind. It is used by sensitisers as an image-receiving base for prints produced by a number of different photographic processing systems, including chemical transfer offset, instant photography, and, in particular, the conventional negative-positive process system. The resulting print essentially consists of resin-coated base paper and an image-containing layer which is adhered to the resin. In the negative-positive process where the image-containing layer is referred to as the emulsion coating, a binder is often employed in the emulsion coating to effect its adhesion to the resin. Conventionally gelatin is used as the binder although alternative synthetic materials are used.

The resin is normally a polyolefin, for example polyethylene, and it is largely due to this material that resin-coated base papers have met with commercial success. Unlike baryta coated photographic base papers, they are substantially impervious to water and photographic chemical processing solutions. They therefore require less drying time and consequently can be processed more quickly. In addition, they use less processing chemicals and are substantially free from distortion. This is of special concern to prints produced from the negative-positive process, especially colour prints, which generally require longer periods of immersion in the processing solutions than is the case with black and white printing paper.

If however, photographic prints made from resin coated base paper are subjected to variations in ambient conditions over long periods of time the image-containing and resin layers tend to deteriorate into a mass of cracks which are aesthetically undesirable and which, in extreme cases, extend over the entire print completely destroying the image. The manifestation of these cracks generally takes months and in some cases years, but can be accelerated if the print is exposed to extreme conditions, such as in the display windows of shops and offices where the problem is particularly acute. In fact, in such display windows cracking can occur within a matter of weeks, and the surface finish imparted to the resin does not seem to make any difference.

The fundamental cause of this cracking problem is shrouded in some uncertainty but it is believed to be due largely to a physical interaction between the image-containing layer and the resin layer. The generally accepted view is that differential expansion and contraction occurs between the image-containing and resin layers in accordance with changes in such ambient conditions as temperature and humidity. In a new photographic print, the resulting differential forces can be resisted by the resin coating and cracking is thus not apparent. But, as the print ages, the resin tends to degrade through the effect of light and/or heat radiation for instance, and gradually becomes embrittled. In this condition, the resin cannot readily resist the differential forces and this therefore frequently leads to the occurrence of cracking in the image-containing layer, or even both the image-containing and the resin layers.

The relatively low stability of the resin layer has been recognised for some time but problems have been experienced when a stabilising additive has been directly incorporated into the resin before it is coated on to the support. These problems include reduced adhesion between the resin and the paper support, and an impairment in the quality of the resin coating caused by the thermal degradation of the stabiliser during the extrusion coating operation. To overcome such problems, a process has been developed in which a stabiliser is incorporated into the paper support furnish or is coated on to the support. In both cases, the stabiliser is of a type that must be capable of migration into the subsequently applied resin layer so that its resistance to cracking can be maintained. In this way, the process affords a means of preventing cracking without any apparent reduction in the adhesion of the resin to the paper support and without any apparent impairment in the quality of the resin coating. Stabilisers are however costly materials and this process, which is described in British Pat. No. 1361219, uses a considerable amount.

A further approach to the problem has been that of our published U.K. Pat. No. 2048278, where stabilisers that can be admixed with the resin prior to extrusion coating are described, giving good stabilisation without significant detriment to the adhesive and quality requirements of the resin coating. These stabilisers are of the formula:

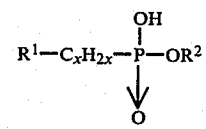

or metal salts thereof, $R^1$ being a sterically hindered hydroxyphenyl group, x being 1 to 4 and $R^2$ a $C_1$ to $C_{12}$ alkyl group.

However, being insoluble, such stabilizers are difficult to disperse in the resin and also tend to cause loss of opacity in the extruded resin coating. These problems are believed to be linked and due to a tendency of the insufficiently dispersed stabilizers to promote aggregation of the titanium dioxide pigment also present in the resin.

Further, some of the amine stabilizer additives are found to migrate to the surface of the resin, causing difficulties in chill roll release after extrusion, and depositing on the rolls of the coating equipment in which photographic emulsion is subsequently applied.

Thus to provide an alternative where these problems are met we have sought a stabilizer system that will give good results in stability but without the problems.

We have now found, surprisingly, the certain polymeric sterically hindered amines of sufficiently high molecular weight used alone as stabilizers can give as good stability results as the phosphonate/amine system without dispersion and opacity problems and also without the roll coating problems of certain of the previously disclosed amines. Chill roll release in the resin coating process is good, the adhesion of paper to resin and resin to emulsion when applied good, and migration problems are not found to arise.

The present invention accordingly provides photographic base paper coated on at least one surface thereof with a layer of polyolefin which contains as the sole stabilizer from 0.01 to 2% by weight of a polymeric hindered amine stabilizer having a mean molecular weight greater than 2500 and having the repeat unit:

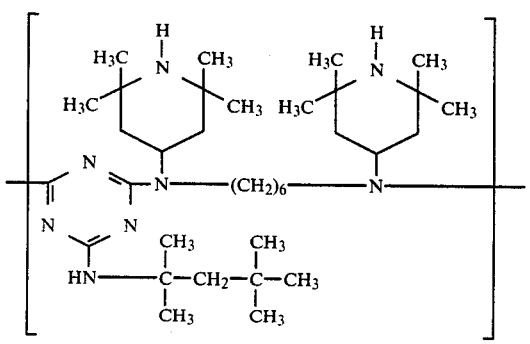

The stabilizer defined above has a mean molecular weight above 2500, softening range 115° to 125° C., is stable to heat at least to 300° C., and it acts by excited state quenching rather than UV absorption. This material is available as "Chimassorb 944" from Chimosa, who recommend it for example for polypropylene fibre.

As far as we are aware this material is the only one of its type available. We expect that similar polymers having homologous repeat units would be similarly effective as stabilizers for polyolefin coated photographic base paper.

The terminology used herein reflects that commonly used in the art. Thus the term "photographic base paper: means a paper suitable for use as the base for photographic prints. The term "photographic paper base" and the abbreviation "photobase" are also sometimes used in the art. Photographic base papers are coated grades of paper and the uncoated paper used to make it is referred to herein as "raw base" to avoid confusion.

The stabilizer used in the present invention prolongs the life of a photographic print in an uncracked form, and its effectiveness is not diminished when photographic printing paper, produced from the base paper of the present invention, is subjected to the wideranging and adverse conditions that are normally encountered during photographic processing.

Photographic base paper usually has a resin coating on the wire side as well as the face side, and as noted an advantage of the present invention is that the stabilizers do not substantially migrate from within the face side coating. This is an important feature of the present invention since resin coated photographic base paper is normally reeled up and stored as such for varying lengths of time. Whilst in this condition, the face side and the wire side resin coatings are in contact enabling a migratory stabilizer to transfer to the wire side resin coating where it would be of no benefit in preventing cracking. However, the stabilizers are substantially non-migratory and therefore this problem is not encountered.

The amount of stabilizer used is in the range 0.01 to 2% by weight of the resin. 0.01 represents the minimum effective amount and 2% represents the maximum amount of stabilizer above which there does not appear to be any additional benefit in preventing cracking. From 0.1 to 0.5% by weight of the resin provides a very useful inhibitory effect against cracking, and about 0.2% is the optimum.

The resin coating of the present invention may also include conventional additives—pigments, such as titanium dioxide, zinc oxide, barium sulphate, antimony trioxide, and carbon black; dyestuffs; optical brightening agents, such as Uvitex OB (Ciba-Geigy); and antistatic agents. Of course, if both a light stabiliser and an optical brightening agent are included, then they should absorb in different regions of the wavelength spectrum in order to obtain maximum benefit and to avoid competition for light of the same wavelength.

The resin itself is normally a polyolefin and preferably polyethylene which may be given a variety of surface finishes, such as glossy, matt, silk stipple, pyramid grain and lustre. The base paper may contain synthetic fibres in addition to, or instead of, cellulose fibres.

The present invention also provides a process for the preparation of a photographic base paper which comprises incorporating the stabiliser into the resin mix and extrusion coating the resin mix on to base paper.

Prior to sensitizing, the resin coated photographic base paper is usually corona treated in order to ensure adequate adhesion between the image-containing layer and the resin layer. Such corona treatment is generally carried out by the photographic base paper manufacturer and to preserve the treatment until such time as the sensitizer can apply the image-containing layer, the treated resin is advisably immediately coated with an anti-adhesion decay solution, as described in British Pat. No. 1 134 211.

The present invention will now be further described with reference to a number of examples.

EXAMPLE 1

A standard raw base paper (for photographic base paper) was coated with a standard polyethylene resin on the wire side at 40 g/m² and on the face side, at both 40 g/m² and 20 g/m² for each of the 'trial' numbers, with the resin mixes set out in the Table 1 below (amounts in kg). Trials 1 to 4 are controls containing no stabilizer, trials 5 to 8 are according to our earlier U.K. Application 2048278 for comparison and trials 9 to 12 are according to this invention.

TABLE 1

| Trial No. | A | B | C | D[1] | D[2] | D[3] |
|---|---|---|---|---|---|---|
| 1 | 5 (10%) | 18.33 | 1.67 | — | — | — |
| 2 | 5.5 (11%) | 17.83 | 1.67 | — | — | — |
| 3 | 6 (12%) | 17.33 | 1.67 | — | — | — |
| 4 | 6.5 (13%) | 16.83 | 1.67 | — | — | — |
| 5 | 5 | 15.83 | 1.67 | 1.67 (0.2%) | 0.83 (0.1%) | — |
| 6 | 5.5 | 15.33 | 1.67 | 1.67 | 0.83 | — |
| 7 | 6 | 14.83 | 1.67 | 1.67 | 0.83 | — |
| 8 | 6.5 | 14.33 | 1.67 | 1.67 | 0.83 | — |
| 9 | 5 | 13.33 | 1.67 | — | — | 5 (0.2%) |
| 10 | 5.5 | 12.83 | 1.67 | — | — | 5 |
| 11 | 6 | 12.33 | 1.67 | — | — | 5 |
| 12 | 6.5 | 11.83 | 1.67 | — | — | 5 |

A White pigmented low density polyethylene.
B Low density polyethylene.
C Optical brightening agent master batch compound.
D Stabiliser master batch compound containing stabilisers as below:
Stabiliser 1 = 3% Irganox 1425
Stabiliser 2 = 3% Tinuvin 622
Stabiliser 3 = 1% Chimassorb 944

BRIEF DESCRIPTION OF THE DRAWING

Transmission density, coating density and pigment content were then measured for each part and coating weight at three points across the web and the plot of transmission density against pigment content forming the drawing herewith prepared.

In the plot the dotted line connects the points of unstabilised samples, and the solid line through the Irganox 1425/Tinuvin 622 points. These lines show quite clearly the reduction in opacity for a given pigment content when this stabiliser combination is used. The Chimassorb 944 points are more randomly spaced and do not easily permit a curve to be passed through them with any degree of certainty. However the points lie around the unstabilised curve, or perhaps even could be considered above it, showing that no problem of image sharpness is present on material containing Chimassorb 944.

Accelerated aging testing is carried out as follows. Resin coated paper is emulsion coated using a chloro/bromide emulsion with a gelatine supercoat. After exposure, the photographic paper is processed as follows:

Developer: 1 minute
Fixer: ½ minute
Wash: 2 minutes

Exposed and developed samples are dried and the resulting print placed in a cabinet and subjected to alternating light and dark cycles with the following ambient conditions:

Light cycle (2 hours)—70°-80° C. (Max)—15% RH
Dark cycle (2 hours)—30° C. (Min)—80% RH The light is generated from four 150 W Osram photoflood lamps placed 50 cm from the transparent top of the cabinet, and the airflow to the cabinet is 5 liter/min for the light cycle and 10 liter/min for the dark cycle.

The normal end point of such testing is complete disintegration of the photographic image, i.e. both emulsion and resin cracked to the extent of loss of all information stored in the image.

In such tests, comparison was made with an unstabilized product, which can show significant deterioration in days in disintegration in 4 weeks. A product stabilized with Chimassorb 944 (whether at 0.05%, 0.1% or 0.2% Chimassorb) had not reached that stage of deterioration after 100 weeks. In contrast a product stabilized with 0.1% or 0.2% Tinuvin 770 (having a molecular weight of 362) was found to have disintegrated in 25 weeks.

Tests for light ageing by carbonyl absorption have similarly indicated the value of the invention.

We claim:

1. Resin coated base paper for photographic prints comprising a paper substrate coated on a first side with a first layer of polyolefin resin adherent to the paper substrate and coated on the other side with a second layer of polyolefin resin adherent to the paper substrate, said second layer including titanium dioxide as an opacifying pigment and containing as the sole stabilizer from 0.01 to 2% by weight of a polymeric hindered amine stabilizer, having a mean molecular weight greater than 2500 and having the repeat unit:

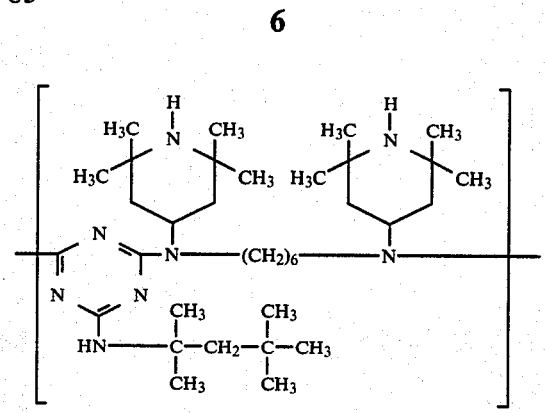

the surface of said second layer being adapted to receive a coating of a photographic emulsion.

2. Photographic printing paper comprising a resin coated base paper as claimed in claim 1 having coated on said second polyolefin resin coating a layer of gelatin based photographic emulsion.

3. Resin coated base paper for photographic prints comprising a paper substrate having a wire side and a face side, said paper substrated being coated on the wire side with a first coating of polyolefin resin adherent to the paper substrate and being coated on the face side with a second coating of polyolefin resin adherent to the paper substrate, said second coating containing (a) titanium dioxide as an opacifying pigment and (b) as the sole stabilizer from 0.01 to 2% by weight of a nonmigrating polymeric hindered amine stabilizer, having a mean molecular weight greater than 2500 and having the repeat unit:

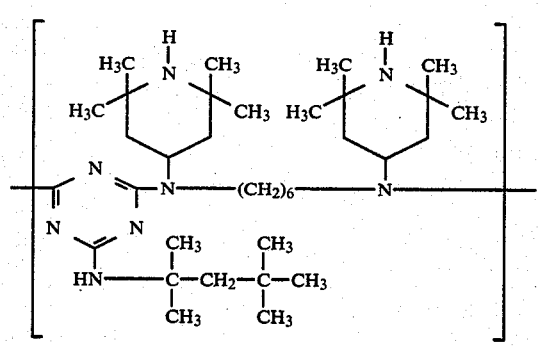

the surface of said second coating being adapted to receive a coating of a photographic emulsion.

4. Resin coated base paper as claimed in claim 3 wherein the amount of said sole stabilizer is from 0.1 to 0.5% by weight.

5. Resin coated base paper as claimed in claim 3 wherein the polyolefin resin in the second coating is polyethylene.

6. Resin coated base paper as claimed in claim 3 wherein the stabilized polyolefin coating contains one or more of pigments, dyestuffs, optical brightening agents and antistatic agents.

7. Photographic printing paper comprising a resin coated base paper as claimed in claim 3 having coated on said second polyolefin resin coating a layer of gelatin based photographic emulsion.

8. A method of making resin coated base paper for photographic prints comprising extrusion coating onto a first side, the wire side, of a paper substrate with a first layer of polyolefin resin, and, before or after coating said first side, extrusion coating directly onto the other side of the paper substrate an adherent polyolefin resin extrusion coating mix containing (a) titanium dioxide as an opacifying pigment and (b) as the sole stabilizer for the polyolefin resin an amount of from 0.01 to 2% by weight of a non-migrating polymeric hindered amine stabilizer having a mean molecular weight greater than 2500 and having the repeat unit:

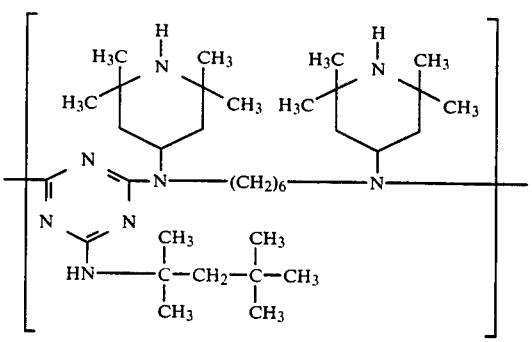

9. A method as claimed in claim 8 wherein the exposed surface of said second layer is corona treated.

10. A method as claimed in claim 9 wherein the corona treated surface of said second layer is further treated with a solution which prevents decay of adhesion.

* * * * *